United States Patent [19]

Gilles

[11] Patent Number: 5,161,341
[45] Date of Patent: Nov. 10, 1992

[54] METHOD FOR BUILDING WALLS WITH MUDDLED CLAY, OR STABILIZED EARTH, PROJECTING MACHINE ADAPTED TO ITS IMPLEMENTATION, AND WALL THUS OBTAINED

[76] Inventor: Pierre Gilles, 40, rue Edouard Vaillant, 93170 Bagnolet, France

[21] Appl. No.: 651,828

[22] Filed: Feb. 7, 1991

Related U.S. Application Data

[63] Continuation of Ser. No. 295,219, Nov. 11, 1988, abandoned.

[30] Foreign Application Priority Data

May 7, 1986 [FR] France .................. 86 06620

[51] Int. Cl.$^5$ .................. B01F 7/00; B05B 9/00; B28B 1/32; E04B 1/16
[52] U.S. Cl. .................. 52/309.17; 52/309.15; 239/142; 239/144; 264/35; 264/263; 264/267; 264/273; 264/279; 264/279.1; 264/309; 366/50; 366/64; 366/66; 366/186; 366/297; 427/421; 427/427
[58] Field of Search .................. 264/31-35, 264/309, 263, 267, 273, 279, 279.1; 427/427, 421; 366/50, 64, 66, 186, 297; 239/142, 144, 417, 424; 52/601, 309.15, 309.17

[56] References Cited

U.S. PATENT DOCUMENTS

| Re. 20,440 | 7/1937 | Westberg et al. . | |
|---|---|---|---|
| 792,557 | 3/1958 | Dussek . | |
| 1,648,874 | 11/1927 | Delaney | 264/309 X |
| 1,867,837 | 7/1932 | Jackson | 264/33 |
| 2,005,301 | 6/1935 | Rafter | 52/601 |
| 2,187,224 | 1/1940 | Cory | 264/309 X |
| 2,463,376 | 3/1949 | Godson | 366/66 |
| 2,504,805 | 4/1950 | Clipson | 427/427 |
| 2,570,042 | 10/1951 | West | 366/66 |
| 2,618,576 | 11/1952 | Brown et al. | 427/427 |
| 2,758,945 | 8/1956 | Widmayer | 427/427 |
| 2,806,277 | 9/1957 | Hand et al. | 264/309 X |
| 2,880,976 | 4/1959 | True | 239/142 X |
| 2,986,848 | 6/1961 | Greene | 52/601 X |
| 3,026,094 | 3/1962 | True . | |
| 3,035,940 | 5/1962 | Hobson | 427/427 X |
| 3,093,505 | 6/1963 | Conway | 427/427 |
| 3,188,059 | 6/1965 | Strong | 366/66 |
| 3,366,368 | 1/1968 | Hibbing | 264/120 X |
| 3,555,763 | 1/1971 | Bloxom | 52/601 X |
| 3,570,569 | 3/1971 | Hartley et al. | 366/186 X |
| 3,578,732 | 5/1971 | Lount et al. | 264/35 X |

(List continued on next page.)

FOREIGN PATENT DOCUMENTS

| 0150353 | 8/1985 | European Pat. Off. . | |
|---|---|---|---|
| 2144439 | 3/1973 | Fed. Rep. of Germany | 366/50 |
| 2305118 | 8/1974 | Fed. Rep. of Germany . | |
| 2420023 | 11/1975 | Fed. Rep. of Germany | 366/50 |
| 378173 | 6/1985 | Fed. Rep. of Germany . | |
| 1170308 | 1/1959 | France . | |
| 2006157 | 4/1969 | France . | |
| 2347166 | 4/1977 | France . | |
| 15156 | 2/1977 | Japan | 52/601 |
| 06174 | 6/1981 | South Africa . | |
| 300620 | 4/1971 | U.S.S.R. | 366/50 |
| 709374 | 1/1980 | U.S.S.R. | 366/66 |
| 1216309 | 3/1986 | U.S.S.R. | 52/745 |
| 145547 | 8/1922 | United Kingdom | 427/427 |
| 543790 | 3/1942 | United Kingdom | 52/601 |

*Primary Examiner*—Karen Aftergut
*Attorney, Agent, or Firm*—Browdy and Neimark

[57] ABSTRACT

Process for manufacturing walls from earth and sand mortars includes making a mortar mixture containing a dry aggregate mass of between 15 and 50% by mass of earth and between 85% to 50% by mass of sand, bonding materials in a mass of at most 10% of the dry aggregate mass, and water in a mass of at most 22% of the total dry mass of earth, sand and bonding materials, stirring the mixture continuously and transferring while stirring the mixture by force into an inlet of a pump, and pumping the mixture from the pump and projecting the mixture within a framework against a vertical projection support and allowing the mixture to set.

15 Claims, 3 Drawing Sheets

U.S. PATENT DOCUMENTS

| | | | |
|---|---|---|---|
| 3,604,174 | 9/1971 | Nelson, Jr. | 52/601 |
| 3,622,656 | 11/1971 | Dewey, Jr. et al. | 264/35 |
| 4,031,282 | 6/1977 | McClinton | 52/309.17 X |
| 4,032,073 | 6/1977 | Aaltonen | 239/142 |
| 4,088,804 | 5/1978 | Cornwell et al. | 427/427 X |
| 4,117,547 | 9/1978 | Mathis et al. | 366/50 X |
| 4,154,039 | 5/1979 | Debeuckelaere | 264/35 X |
| 4,185,437 | 1/1980 | Robinson | 52/601 |
| 4,204,645 | 5/1980 | Hopp | 239/417 X |
| 4,253,288 | 3/1981 | Chun | 52/743 X |
| 4,263,346 | 4/1981 | Sandell | 239/424 X |
| 4,292,351 | 9/1981 | Ito et al. | 427/427 X |
| 4,329,822 | 5/1982 | Russell | 52/309.17 X |
| 4,364,987 | 12/1982 | Goodwin | 52/601 X |
| 4,442,648 | 4/1984 | Reece | 52/601 X |
| 4,491,420 | 1/1985 | Addison | 366/156 |
| 4,493,557 | 1/1985 | Nayak et al. | 366/297 X |
| 4,554,124 | 11/1985 | Sudrabin | 52/601 X |
| 4,612,240 | 9/1986 | Johnson et al. | 427/427 X |
| 4,616,784 | 10/1986 | Simmons et al. | 239/424 X |
| 4,633,634 | 1/1987 | Nemmer et al. | 52/601 X |
| 4,649,682 | 3/1987 | Barrett, Jr. | 52/601 X |
| 4,691,490 | 9/1987 | Leaver | 52/309.17 X |
| 4,702,058 | 10/1987 | Bennett | 52/601 |
| 4,708,745 | 11/1987 | Schönhausen | 427/427 X |
| 4,748,771 | 6/1988 | Lehnert et al. | 52/309.17 X |
| 4,775,239 | 10/1988 | Martinek et al. | 366/300 X |
| 5,021,202 | 6/1991 | Novotny | 264/35 X |

METHOD FOR BUILDING WALLS WITH MUDDLED CLAY, OR STABILIZED EARTH, PROJECTING MACHINE ADAPTED TO ITS IMPLEMENTATION, AND WALL THUS OBTAINED

This application is a continuation of co-pending parent application Ser. No. 07/295,219, filed Nov. 11, 1988, now abandoned without prejudice in favor of the present application.

BACKGROUND OF THE INVENTION

The present invention relates to a process for the construction of walls of mortar based on earth and sand with a small admixture of bonding materials, i.e. mixtures which are generally referred to as cobs; projecting apparatus which is specifically suitable for the application of this process; and a wall thus obtained.

Cobs find application in particular in the field of buildings and public works, for example:
- the construction of the walls of buildings for various purposes, the walls of dwelling-houses, and enclosing walls,
- the renovation of the facades of old houses constructed on the basis of earth (cobs, daub, clay and straw, air-dried bricks, etc.),
- the facing of any facades of buildings or enclosing walls worked in a traditional manner (composite blocks, concrete screens, diverse bricks),
- the forming of various slopes and embankments of soil.

"Cobs" are mortars based on soil which is frequently clayey, and sand mixed in varying proportions according to the nature of the soil, with an admixture of bonding materials determined in terms of the dry mass of the initial aggregates (earth and sand) and an admixture of water.

These mortars are then normally placed between two parallel boards and tamped by hand with a rammer, resulting in an increased application time and thus affecting costs. This explains the virtual disappearance of this technique since 1945.

Other variations on the basis of stabilized earth have also been suggested, which variations call for the making of air-dried bricks by pressing; these bricks are then placed in position in known manner, which entails the costs of manual labour very similar to those of conventional concrete blocks (Rollow agglomerates).

Machines suitable for projecting compositions of mortars by a process referred to as "wet" (the mortar receiving its final supply of water before passing into the machine) are known, for example according to the principle of the "MOINEAU" pump (this includes a steel rotor in the form of "a pig's tail", rotating in a stator of flexible matter such as rubber or the like, sheathing the inner surface of a tubular duct of steel or cast iron). These machines frequently comprise an hydraulic transmission system enabling the simple and quick reversal of the direction of rotation of all the movable parts (in particular impeller, pumps). This is the case, inter alia, in the PRECIJET H 3000 machine of MIXJET FRANCE, the MF 80 HY of MOSSMER, and the P13 of PUTZMEISTER. However, these machines work properly only with microconcretes which have a high content of binding material (in the order of 20 to 30%) and which are very liquid. These types of mortars can be applied only in successive thin layers of about 0.5 to 2 cm, and can therefore in fact be used only for extra-thin facings of facades or concrete coatings on latticed supports of the STUCANET or NERGALTO type.

Various designs of projecting machines already on the market are not technically workable, and therefore even less commercially viable, due to numerous operational difficulties, for the projection of cob mortars with lower contents of binding materials and water, which are nevertheless necessary for the making of very thick walls (layers of more than 5 cm in thickness placed into position in one single operation on a movable, light, bottom support).

Such mortars with a low admixture of binding materials and water, in fact bring about the rapid formation of an air pocket in currently used machines, at the level of the mixture of the cob mortar in the supply tank of the machine adjacent and above the supply impeller. This causes the frequent loss of priming of the mortar pump and the need to drain the supply tank completely, in order to "break" the arch of mortar hanging over the impeller, thus causing the complete loss of the batch in progress and causing a considerable loss of operational time.

Also the low content of binding material brings about a rapid segregation of part of the sand from the cob-mortar mixture statically waiting in the supply tank of the main body of the machine; this sand then accumulates in non-elastic plugs in the dead spaces of the supply tank and in particular at the inlet of the supply orifice of the mortar pump, this providing a further cause for the loss of priming of the pump, and even the danger of a complete blockage of the entire machine. This results in a renewed need to drain the supply tank to enable the cleaning of the approaches to the supply orifice of the pump.

Finally, in the event of a delay in carrying out the projection of the mixture statically waiting in the supply tank, drying of the mixture occurs and the mortar commences to set, thus aggravating the formation of arches and air pocket effects adjacent the supply impeller, in particular in the case of supply tanks having a V-shape, which are presently used.

The invention has the aim of alleviating these disadvantages.

SUMMARY OF THE INVENTION

In principle, the invention is based on the realization that the ultimate quality and the durability of cob-walls of the kind described above, which requires the elimination of the phenomena of contraction and of cracking, implies recognition of the necessity of a metering range for preparing the cob mortar. Applicant believes that this principle is not at all acknowledged in projecting machines on the market at present.

Tests conducted by the Applicant have, in fact, revealed that it is necessary to use, for the purposes of constructing such cob-walls, proportions corresponding to a percentage of dry aggregates of 15 to 50% by mass of earth and 50 to 85% by mass of sand, depending upon the clayeyness of the soil; to this must be added, to allow construction by projection in one single operation, a small amount (less than 10% and preferably about 7.5%) of bonding materials, frequently comprising two thirds of hydraulic lime to one third cement, relative to the total dry mass of the aggregates (earth and sand); the total water content of the mortar to be projected must be less than 22% (preferably 20%) of the total mass of all the dry matter (earth and sand and bonding material).

The present invention therefore has the object of solving the problems listed above which are inherent in wet-process projecting machines operating on the basis of mortar pumps, and provided heretofore only for liquid microconcretes. Applicant believes that this is achieved by providing a series of essential and complementary modifications to the present design of these projecting machines to render them suitable for the projection of viscous mortars with a low content of bonding material, i.e. less than 10%, and in particular cob mortars.

Accordingly, the invention provides a process for the manufacture of walls of earth/sand mortars, which includes the steps of:
- making up a mixture containing between 15 and 50% by mass of earth and 85% and 50% by mass of sand, to which is added a quantity of bonding materials representing at most 10% of the dry mass of aggregates (earth and sand), as well as water, representing at most 22% of the total dry mass (earth and sand and bonding materials);
- stirring the mixture continuously and transferring it, preferably by force, to the inlet of a pump;
- pumping the mixture and projecting it against a projection support (Preferably, the projection support is a removable wall which is removed after setting of the mortar).

According to this process, a dynamic, comprehensive and continuous handling of all the fluids (namely all the components required for mortars, including water) which are waiting in the supply tank of the main body of the machine, is therefore provided. This aim is realized in a projecting machine according to the invention, as follows:
a) By virtue of a new design of the shape of the outer casing of the supply tank by adjusting the "body" of the casing to be closer to the group of internal movable parts, in order to eliminate dead spaces.
b) By virtue of the application of an overall system for continuous mixing. The system comprises a set of two contrarotating mixers (there may be two or more such mixers, but for reasons of economy these are preferably limited by example herein to two) on parallel horizontal axes, and having overlapping sweep zones (the sweep zones overlapping by preferably three-quarters). This set is itself placed immediately above a supply impeller and close to the sweep zone of the latter. This arrangement at least reduces the danger of the formation of an air pocket above and adjacent to the supply impeller, due to the erratic movements of the continuously-agitated mortar. This erratic effect is capable of being intensified by the ability to reverse instantaneously and at any given moment the direction of rotation of the set of mixers, owing to the flexibility of the associated hydraulic transmission.
c) In similar fashion, the supply impeller, having stub blades or a screw conveyor, operates within a semi-tubular sheet-metal duct arranged close to the sweep zone of the impeller, and placed directly below the full length of the supply tank and the set of mixers. This semi-tubular duct encases the "lower two-thirds" of the sweep zone of the supply impeller, while leaving the "upper one-third" free to open directly into the supply tank and the set of mixers.

The invention therefore also provides in a synthetic manner a wet-process projection machine of the type comprising a supply tank, a supply impeller at the base of the tank, a pump arranged to be an extension of the impeller, and a projection nozzle connected to this pump by a flexible pipe, characterised in that, in the tank, are arranged at least two contra-rotating mixers on rotational axes which are parallel to the axis of the impeller and which have overlapping sweep zones located adjacent the sweep zone of the impeller, the tank having a casing corresponding, at least below the level of the rotational axes of the mixers, to the outlines of the zones swept by the mixers and the impeller.

The entirety of this apparatus promotes complete and continuous mixing of the mortar between the supply tank and the impeller, thus preventing segregation of the sand drying of the mortar, untimely setting of the mortar and, especially, the danger of an air pocket.

According to a preferred embodiment of the invention, a novel part, which may be a chamber, is provided after the supply impeller and immediately before the pump (preferably a piston-pump, or one of the MOINEAU type). This performs two additional functions related to the use of mortars having a low content of bonding materials and of water, while reducing the danger of blocking of the machine or of the pump by plugs of sand resulting from the partial segregation of the mortar:
a) This chamber projects from the main body of the machine and is arranged in direct alignment with the semi-tubular casing of the supply impeller, without having any dead space or interruption in the continuity of the flow of fluids in the course of transit. This chamber advantageously takes the form of a tubular casing of sheet-metal or cast-iron, arranged around the sweep zone of the extension of the impeller, thus performing the function of a passage for forcing the mortar to the pump.
b) Simultaneously, this chamber performs the function of a decompression chamber and of clearing out of the sand resulting from a possible segregation and tending to accumulate at the supply orifice of the pump. For that purpose, the chamber preferably comprises at least one inspection door of the movable cover type. Two inspection doors are advantageously placed in opposition on opposite sides of the chamber the doors opening vertically or laterally, for the purpose of rapid cleaning out of plugs of sand.

The above devices in their entirety are advantageously combined to constitute a complementary unit for the projection of mortars which are low in bonding materials and water, in particular cobs. These modifications may be carried out without much difficulty to projection machines emanating from the workshops of various manufacturers; in fact, these modifications place no constraint on the standard use of the said machines with fluid microconcretes.

The invention also contemplates a wall of earth/sand mortar, characterized in that it includes earth and sand in complementary proportions of dry mass between 15 and 50% by mass of earth and 85 to 50% by mass of sand, and less than 10% bonding materials relative to the dry mass of the aggregates (earth-sand), and which is held in position by a skeleton framework provided, at least on one of its surfaces, with a lattice support.

According to preferred additional embodiments of the invention:

In the case of a soil surface comprising chalk and/or clayey matter, the preferred proportions for the constituents of the cob mortar may be about 80% of sand and about 20% of earth. In the case of a soil surface comprising laterites and bauxites, the preferred proportions for the constituents of the cob mortar may be about 65% of sand and about 35% of earth. The proportions for the constituents of the cob mortar which are presently most frequently used are between 15 and 35% of earth and 85 and 65% of sand. Projection is advantageously carried out by means of a nozzle comprising a venturi-shaped chamber for the annular injection of compressed air about the mortar supplied under pressure by the pump to the nozzle.

Cob-walls are advantageously kept in position by lattice walls, frequently embedded in the cob walls, and preferably secured to a rigid reinforcing skeleton framework. The lattice walls may be equipped with reinforcing netting, the entity together with the lattice walls constituting a casting or projection caisson.

The aims, characteristics and advantages of the invention will emerge from the description below, given by way of non-limiting example, with reference to the attached drawings, in which:

DETAILED DESCRIPTION OF THE DRAWINGS

Figure 7:
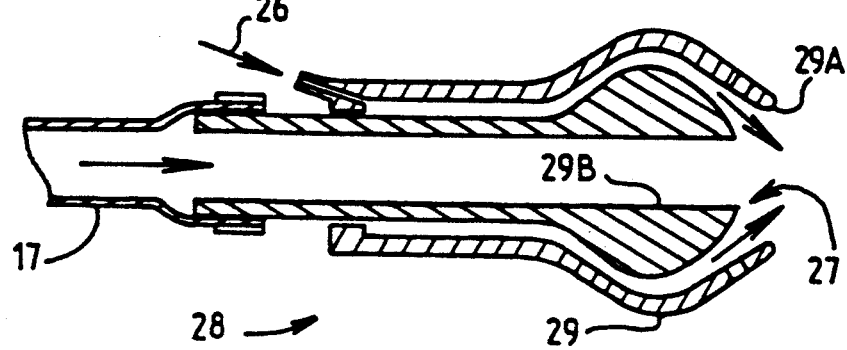
FIG. 7 is a diagrammatic axial sectional view of a projection nozzle according to the invention.

The projecting machine illustrated by way of example in FIGS. 1 to 4 and, additionally, FIG. 7, permits the formation of an earth-sand mixture with a low content of bonding materials and water, the continuous mixing of this mixture and forcing thereof to the inlet of a pump, in this case, one of the MOINEAU type, and finally its projection against an appropriate support, which can be fixed or removable.

Figure 1:
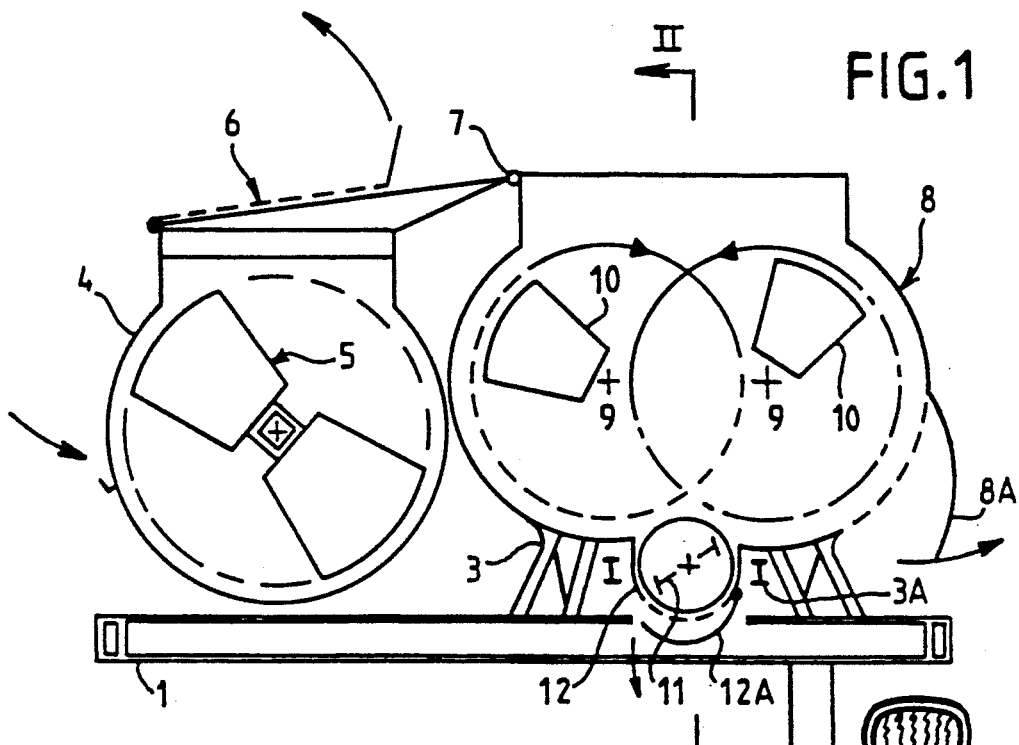
FIG. 1 is a diagrammatic cross-section of a projecting machine according to the invention.
Figure 2:
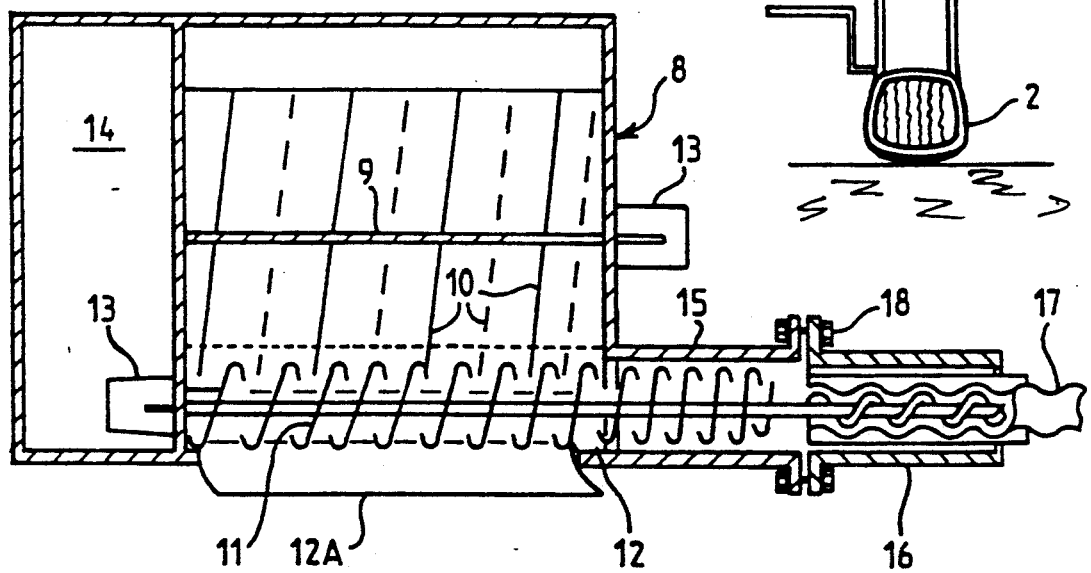
FIG. 2 is a diagrammatic view in vertical axial section along line II—II.
Figure 3:
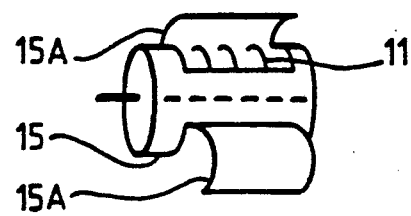
FIG. 3 is a detailed view showing in perspective the chamber, the inspection doors of which are open.
Figure 4:
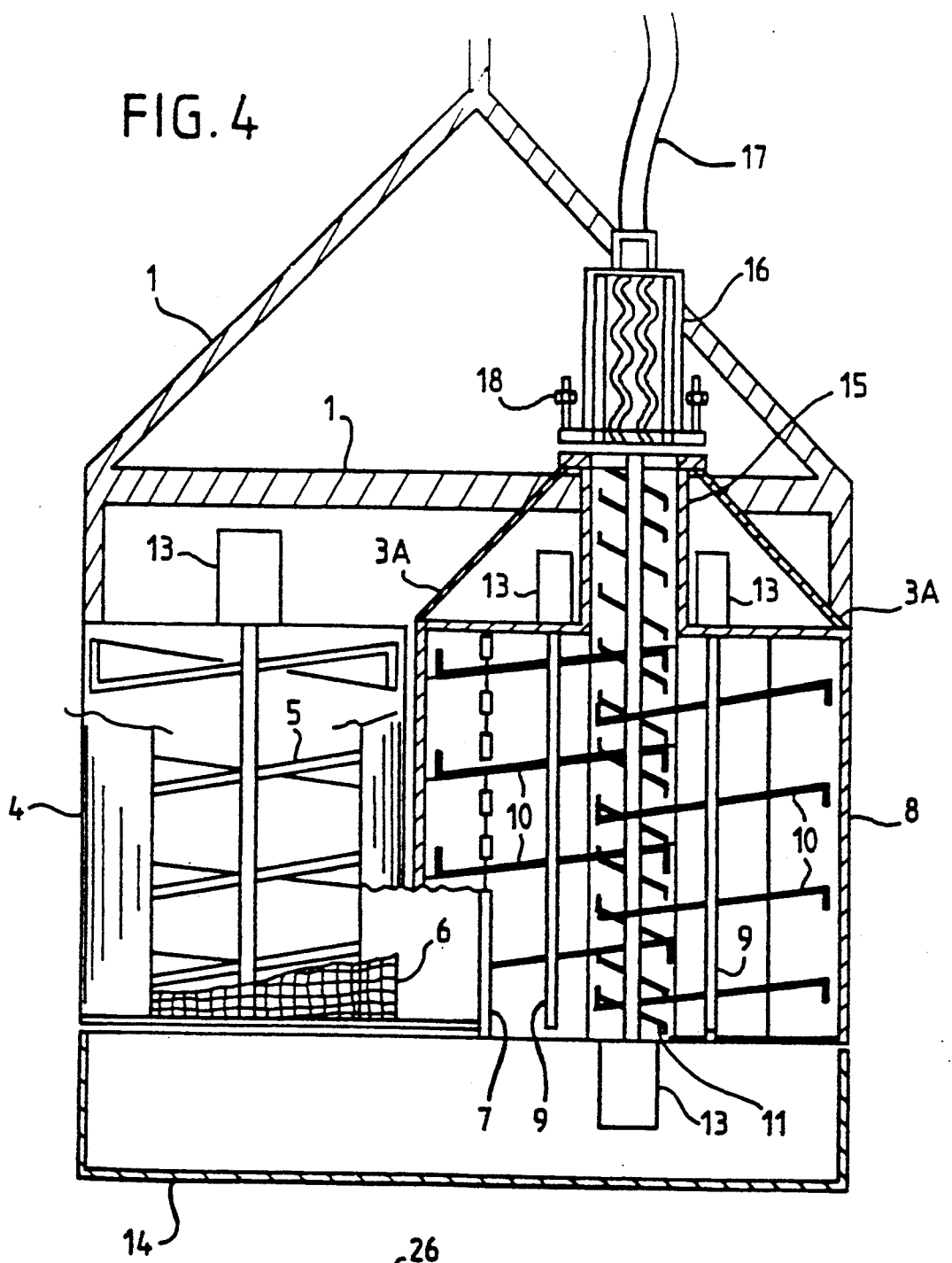
FIG. 4 is a diagrammatic view from above, partially stripped, of the projecting machine of FIGS. 1 and 2.

The machine as such is, in the present case, carried by a support frame 1, of road gauge, and resting on running gear 2 of the same gauge, only one section of which is illustrated in FIG. 1. The machine is equipped with fixing members 3 for attachment to the frame 1, and structural reinforcements 3A between the tank and the chamber (see below).

The projection machine comprises a main body, equipped with a mortar pump, about which are arranged accessory members. An outer mixing complex is arranged at the side of the main body of the machine for the purpose of preparing and batching the mortars. This complex comprises a mixer casing 4 of thick sheet-steel in semi-tubular form which opens upwardly and in which rotates a mixer 5 on a horizontal axis. The mixer 5 is driven by an hydraulic motor 13 supplied with energy by a unit 14 comprising a central hydraulic pump driven by a heat engine (not illustrated) and permitting reversal, if desired, of the mixing direction.

Above the open top of the mixer casing is arranged a rocking screen 6 for the screening and gauging of the various aggregates which will compose the mortar. This screen, having a mesh determined in terms of the gravel-handling capacity of the MOINEAU pump 16 of the machine, may be driven mechanically if the input called for is substantial.

A horizontal pivotal connection 7 interconnects the mixing complex and the main body of the machine and permits the tilting of the mixing complex (by means of hydraulic jack which is not illustrated) with a view to feeding the machine; generally, the screen is, to begin with, tilted to the side of the mixer casing (see the arrows) to permit discharge of the flow of viscuous mortar towards the supply tank of the main body of the machine.

After this supply stage, the mixing complex and then the screen return to their original positions in order to permit the preparation of a fresh mixing batch during the projection of the batch which has just been poured into the main body.

At the rear of the frame is provided the unit (heat engine/central hydraulic supply pump) 14 provided to give the necessary power to the various hydraulic-drive motors 13.

The main body comprises a supply tank 8, the casing or body, for example of thick sheet-steel, of which is constructed so as to be close to the sweep zones of the various movable parts. The supply tank preferably comprises a lateral gate 8A for inspection and emptying of the supply tank, intended in particular to facilitate cleaning of the tank after use. In the interior of this tank and sweeping the total interior space thereof, is a set of two parallel mixers 9 contra-rotating about horizontal axes, and having blades 10, the sweep zones of which overlap, preferably by about three-quarters.

Below this set of horizontal mixers is arranged a supply impeller 11 having stub blades (or, possibly, a screw conveyor) two-thirds of which is housed in a semi-tubular casing of sheet-steel 12 forming an integral part of the casing of the supply tank and forming, together with the latter, the main body of the machine. This casing 12, in its lower part, is provided with a drain gate 12A for cleaning of the machine. The sweep zone of the impeller 11 will be placed as close as possible to the sweep zones of the blades 10 of the set of horizontal mixers, leaving only as much open space as is required to prevent blockage by gravel.

As an immediate extension of this semi-tubular casing 12 and projecting outside the main body of the machine, is arranged a chamber 15 in the form of a completely tubular sheath enclosing in its entirety the sweep zone of the impeller 11, which impeller extends lengthwise into the sheath. This sheath, of reinforced sheet-steel, and the impeller jointly form a force-feeding duct for the mortar pump 16; and care must merely be taken to dimension this duct so as to obtain an input of fluids equivalent to the capacity of the mortar pump, in order not to re-create the problem of sand plugs upstream of the inlet to the chamber.

Reinforcing mountings 3A (see FIGS. 1 and 4) are provided to rigidify the main body of the machine and chamber, dependent on the power of the machine.

This chamber comprises, moreover, movable inspection doors (of the hatch type) for upper and lower openings 15A in order to provide means for unstopping and decompressing of the duct by means of simple direct cleaning out with a trowel, in the relatively unlikely eventuality of the formation of a plug of sand at the inlet to the mortar pump.

A form of embodiment having lateral openings may also be provided, but the cleaning-out of such variation will be slower.

The pump, in the present case of the MOINEAU type, and having dimensions determined by capacity requirements, is crown-bolted at 18 on a flange of the chamber and forms an extension of the latter. The rotor of the MOINEAU pump is driven by the axle of the impeller through a universal joint (not illustrated) in order to allow free articulation of the rotor of steel within a flexible stator, this being the principle on which the MOINEAU pump is based. Exit of the fluids placed under pressure in the MOINEAU pump takes place at its other end into a flexible pipe 17, which conducts the mortar to the projection nozzle of FIG. 7.

Conventional projection nozzles for microconcretes operate on the principle of the compression of the slug of mortar (squeeze bore) before its atomization via a central jet of air injected into an expansion chamber via a rigid duct which passes through the slug of mortar. This solution is not completely satisfactory in the case of the present invention, in view of the existence of numerous gravels which tend to stick and accumulate about the rigid air duct, in the chamber, and resulting in the danger of the formation of plugs of mortar and of gravel in the nozzle. It is therefore preferred according to the invention that the nozzle 28 does not compress the slug of mortar, and that the nozzle 28 injects the compressed air 26 necessary for the atomization of this mortar via a peripheral injection crown, thus focussing jets of compressed air concentrically into an expansion chamber 27, similar to a rocket venturi. A projection mouthpiece (removable) 29A, arranged in an extension of the outer sheath 29 of the venturi, (this sheath is here movable longitudinally along the body 29B of the branch-pipe), permits limitation of the dispersion of the atomized mortar appropriate for the fluidity of the mortar mixture used, by exerting pressure on the edge of the exit section of the nozzle. Advantageously, a remote control member to control the output of the mortar pump 16, is provided on this nozzle.

Figure 5:
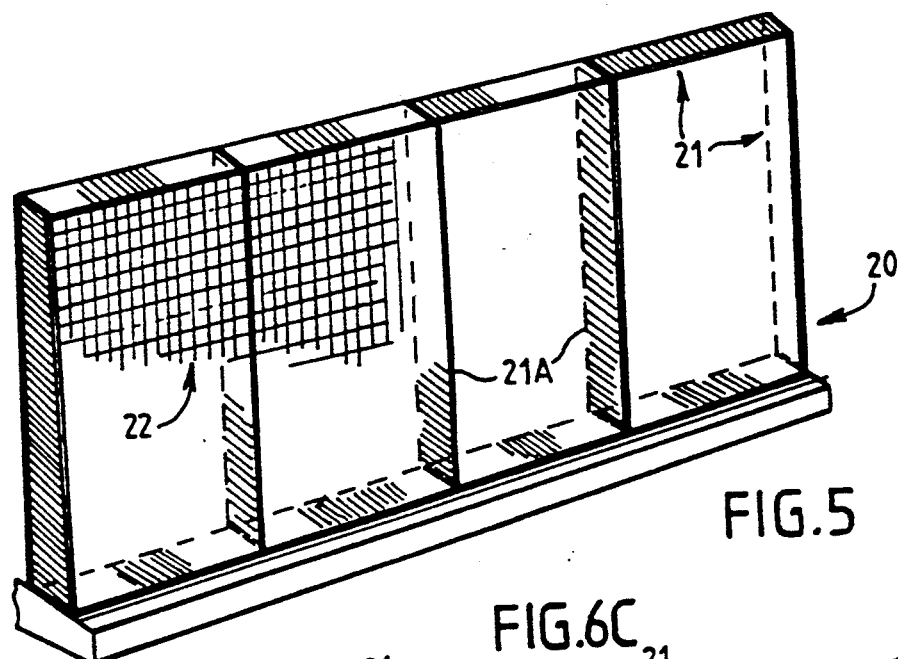
FIG. 5 is a perspective view of a caisson for the manufacture of a cob-wall.

FIG. 5 illustrates a frame or caisson for integration in the body of a cob-wall. The frame is in the form of embedded prefabricated panelling 20, thus eliminating the need for conventional double boarding as a result of the relative simplicity of the invention, thereby permitting the application of thick layers (more than 5 cm and up to 30 cm, or more) which can be applied in a single operation; this caisson subsequently contributes to the resistance of the wall to collapsing or uprooting. This simple caisson is in the present case composed of a frame 21 of wooden rafters reinforced by vertical rafters 21A, to the outer surface of which plastic netting 22 is nailed, the netting contributing to reduce the danger of extrusion of the mortar during drying. These caissons are prefabricated in units of varying design, but are manually portable and may comprise, e.g. doors and windows which are previously placed in position in a workshop. The inner surface of this caisson provides support for the projection, either by the quick placing in position of a recoverable, light, movable board 19 (FIG. 6B) or by the presence of a disposable sheet of cardboard clamped to the wooden rafters. Projection takes place at a depth 23 (FIG. 6C) at least equal to that of the caisson (preferably double) with resultant embedding in the mixture of the plastic netting 22.

The caisson subsequently remains integral with the main body of the wall and contributes to the durability of the wall panel in the same way as a conventional frame of wood.

Figures 6A, 6B, 6C, 6D:
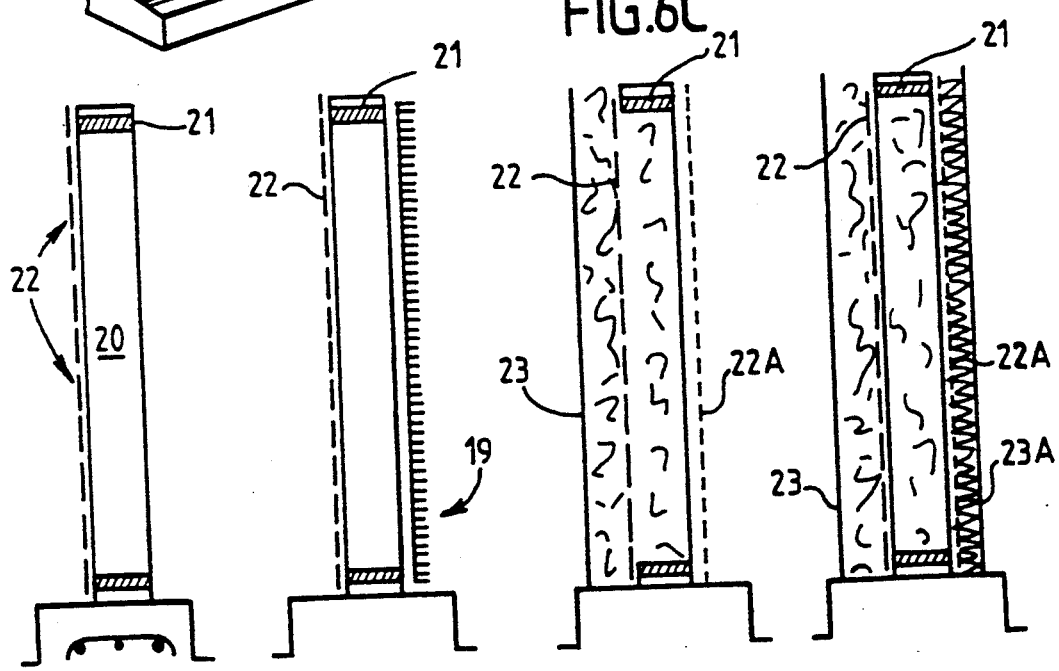
FIGS. 6A to 6E show the successive stages of the manufacture of a cob-wall from the positioning of the empty caisson of FIG. 5 up to its completion.
Figure 6E:
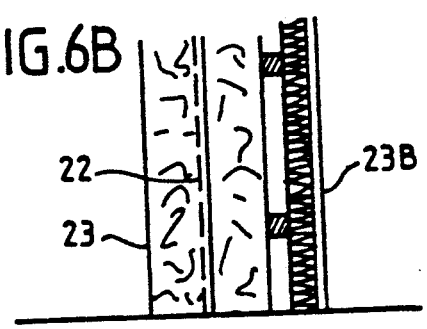

An inner finishing layer 23A may be added to netting 22A attached to the caisson and/or the wall (see FIGS. 6C and 6D). In the variation illustrated in FIG. 6E, the inner facing 23A is replaced by an inner insulating lining 23B.

A variation of this type of caisson, having a metallic frame, may be provided, and is characterized by substituting the wooden rafters with metallic mesh netting which serves as a wind-brace for a frame of metallic profiles. In this case, the netting is not absolutely necessary, the mesh ensuring the support of the mortar.

The preceding description is provided only by way of illustration and numerous variations may be provided by the specialist in the field without going beyond the scope of the invention, in particular through the use of various types of mortar pumps existing in the marketplace. Especially recommended are various types of piston pumps when substantial pressure is required for the preparation of the mortar outside the machine.

I claim:

1. An earth and sand mortar wall comprising between 15 to 50% of earth and 85 to 50% of sand, and less than 10% bonding materials relative to the earth and sand, the wall including a caisson comprising a framework at least partially surrounding the wall and provided, at least on one of its surfaces, with a netting embedded in the wall.

2. A wall as claimed in claim 1 comprising between 15 to 35% of earth and 85 to 65% of sand, and 7.5% of bonding materials relative to the earth and sand.

3. A process for manufacturing walls from earth and sand mortars comprising:
    making a mortar mixture containing a dry aggregate mass containing between 15 to 50% by mass of earth and between 85% to 50% by mass of sand, bonding materials in a mass of at most 10% of the dry aggregate mass, and water in a mass of at most 22% of the total dry mass of earth, sand and bonding materials;
    stirring the mixture continuously and transferring the mixture while stirring by force into an inlet of a pump;
    pumping the mixture and projecting the mixture within a framework against a vertical projection support and letting the mixture set.

4. A process according to claim 1, wherein the projection support is a removable wall which, after setting of the mixture, is removed from the mixture set within the framework.

5. A process according to claim 1, wherein the water mass is about 20% of the total dry mass and the mass of bonding materials is about 7.5% of the dry aggregate mass.

6. A process according to claim 1, wherein the mixture contains between 15 to 35% of earth and 85 to 65% of sand.

7. A process according to claim 5, wherein the mixture contains between 15 to 35% of earth and 85 to 65% of sand.

8. A mortar projection machine comprising: a supply tank, a supply impeller at a base of the tank, with an impeller axis and an impeller sweep zone, a pump arranged as an extension of the impeller, and a projection nozzle attached to the pump by a flexible pipe; there being arranged in the tank at least two contrarotating mixers on rotational axes (9) which are parallel to the impeller axis and which have overlapping sweep zones adjacent the impeller sweep zone, the tank having a casing closely enclosing, at least below a level of the rotational axes of the mixers, sweep zones of the mixers and the adjacent impeller sweep zone.

9. A machine according to claim 8, wherein the casing closely encloses about two-thirds of the impeller sweep zone.

10. A machine according to claim 8, further comprising means forming a chamber and feed passage provided between the supply tank and the pump.

11. A machine according to claim 10, wherein at least one access door is arranged on the means forming the chamber and feed passage.

12. A machine according to claim 8, wherein the nozzle comprises a peripheral injection crown (29–29B) for injection of jets of compressed air concentrically into a rocket venture shaped expansion chamber (27) of the nozzle, the expansion chamber having an exit orifice controlled by a movable mouthpiece movable along a hollow central body secured at an end of the pipe.

13. A machine according to claim 10, wherein the nozzle comprises a peripheral injection crown (29–29B) for injection of jets of compressed air concentrically into a rocket venture shaped expansion chamber (27) of the nozzle, the expansion chamber having an exit orifice controlled by a movable mouthpiece movable along a hollow central body secured at an end of the pipe.

14. A process for projecting an earth and sand mortar comprising the steps of:
    making successive batches of a mortar mixture containing a dry aggregate mass containing between 15 to 50% by mass of earth and between 85% to 50% by mass of sand, bonding materials in a mass of at 10% of the dry mass of earth and sand, and water in a mass of at most 22% of the total dry mass of earth, sand and bonding materials;
    stirring the mixture continuously and transferring the mixture while stirring by force into an inlet of a pump;
    pumping and projecting the mixture.

15. A mortar projection machine for projecting a sand and earth mixture including water in a mass of at most 22% of a dry mass of mortar materials, comprising:
    a stirring tank;
    a tiltable mixing casing containing a mixer for mixing said water and mortar materials, said tiltable mixing casing being connected to said stirring tank by a pivotal connection allowing said tiltable mixing casing to pivot between a mixing position for the mixing of successive batches containing said water and said mortar materials and a discharge position for discharging said successive batches within said stirring tank;
    at least two contrarotating stirring arms in said stirring tank for continuously stirring said mixture of said successive batches, said stirring arms being mounted on horizontal parallel axes, and having overlapping sweep zones;
    a supply impeller at a lower portion of said stirring tank, having an horizontal axes parallel to said parallel axes of said stirring arms, and having a sweep zone adjacent said overlapping sweep zones;
    said tank having a casing closely enclosing, at least below a level of said horizontal axes of said stirring arms, said sweep zone of said stirring arms and of said impeller;
    a pump arranged as an extension of said impeller;
    means forming a chamber and feed passage between said stirring tank and said pump; and
    a projection nozzle attached to said pump by a flexible pipe.

* * * * *